(12) United States Patent
Chen et al.

(10) Patent No.: US 10,979,923 B2
(45) Date of Patent: Apr. 13, 2021

(54) CHANNEL STATE INFORMATION ACQUISITION METHOD AND DEVICE

(71) Applicant: CHINA ACADEMY OF TELECOMMUNICATIONS TECHNOLOGY, Beijing (CN)

(72) Inventors: Wenhong Chen, Beijing (CN); Qiubin Gao, Beijing (CN); Runhua Chen, Beijing (CN); Hui Li, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 31 days.

(21) Appl. No.: 15/575,809

(22) PCT Filed: Apr. 13, 2016

(86) PCT No.: PCT/CN2016/079186
§ 371 (c)(1),
(2) Date: Nov. 20, 2017

(87) PCT Pub. No.: WO2016/184278
PCT Pub. Date: Nov. 24, 2016

(65) Prior Publication Data
US 2018/0124624 A1    May 3, 2018

(30) Foreign Application Priority Data

May 21, 2015 (CN) .......................... 201510264054.3

(51) Int. Cl.
*H04W 24/10* (2009.01)
*H04L 1/00* (2006.01)
(Continued)

(52) U.S. Cl.
CPC .......... *H04W 24/10* (2013.01); *H04B 7/0621* (2013.01); *H04B 7/0626* (2013.01);
(Continued)

(58) Field of Classification Search
None
See application file for complete search history.

(56) References Cited

U.S. PATENT DOCUMENTS

2009/0124290 A1* 5/2009 Tao ...................... H04B 7/0874
455/562.1
2012/0257515 A1* 10/2012 Hugl ..................... H04W 24/10
370/252
(Continued)

FOREIGN PATENT DOCUMENTS

CN    102082636 A    6/2011
CN    102281128 A    12/2011
(Continued)

OTHER PUBLICATIONS

International Search Report for PCT/CN2016/079186, dated Jun. 30, 2016, and its English translation provided by WIPO.
(Continued)

*Primary Examiner* — James P Duffy
(74) *Attorney, Agent, or Firm* — Ladas & Parry, LLP

(57) ABSTRACT

The present disclosure provides a CSI acquisition method. A network side device indicates a CSI feedback configuration group for aperiodic CSI feedback to a UE, and transmits DCI to the UE, the DCI configured to indicate the UE to perform the aperiodic feedback in accordance with an optimum CSI feedback configuration in the CSI feedback configuration group.

18 Claims, 4 Drawing Sheets

--- indicating, by a network side device, a CSI feedback configuration group for non-periodic CSI feedback to a UE — 101 transmitting, by the network side device, DCI to the UE, the DCI configured to indicate the UE to perform the non-periodic CSI feedback in accordance with an optimum CSI feedback configuration in the CSI feedback configuration group — 102

(51) Int. Cl.
*H04B 7/06* (2006.01)
*H04W 24/02* (2009.01)
*H04W 72/04* (2009.01)
*H04B 7/0456* (2017.01)
*H04W 88/02* (2009.01)

(52) U.S. Cl.
CPC ......... *H04B 7/0632* (2013.01); *H04B 7/0643* (2013.01); *H04L 1/0026* (2013.01); *H04L 1/0028* (2013.01); *H04W 24/02* (2013.01); *H04W 72/042* (2013.01); *H04B 7/0456* (2013.01); *H04W 88/02* (2013.01)

(56) References Cited

U.S. PATENT DOCUMENTS

| | | | |
|---|---|---|---|
| 2013/0028182 A1 | 1/2013 | Geirhofer et al. | |
| 2013/0039199 A1* | 2/2013 | Liao | H04B 7/024 370/252 |
| 2013/0070720 A1 | 3/2013 | Pan et al. | |
| 2013/0089064 A1 | 4/2013 | Ding et al. | |
| 2013/0107832 A1 | 5/2013 | Kim et al. | |
| 2013/0121301 A1 | 5/2013 | Kim et al. | |
| 2013/0279363 A1 | 10/2013 | Huang et al. | |
| 2013/0303231 A1 | 11/2013 | Yiu et al. | |
| 2014/0119284 A1 | 5/2014 | Baldemair et al. | |
| 2014/0192917 A1 | 7/2014 | Nam et al. | |
| 2015/0043673 A1* | 2/2015 | Lee | H04B 7/0632 375/267 |
| 2015/0071187 A1 | 3/2015 | Chen et al. | |
| 2015/0085750 A1 | 3/2015 | Zhang et al. | |
| 2015/0117380 A1* | 4/2015 | Zhang | H04W 24/10 370/329 |
| 2015/0257130 A1* | 9/2015 | Lee | H04L 5/0092 370/336 |
| 2016/0165457 A1 | 6/2016 | Inoue et al. | |

FOREIGN PATENT DOCUMENTS

| | | |
|---|---|---|
| CN | 102281131 | 12/2011 |
| CN | 102291223 A | 12/2011 |
| CN | 103561475 A | 2/2014 |
| JP | 2014506099 A | 3/2014 |
| JP | 2015502686 A | 1/2015 |
| JP | 2015033097 A | 2/2015 |
| WO | 2013/189018 A1 | 12/2013 |
| WO | 2013189018 A1 | 12/2013 |
| WO | 2014109557 A1 | 7/2014 |

OTHER PUBLICATIONS

Written Opinion of the International Search Authority for PCT/CN2016/079186, dated Jun. 30, 2016, and its English translation provided by Bing.com Microsoft Translator.
International Preliminary Report on Patentability (IPRP; Ch. 1) for PCT/CN2016/079186, dated Nov. 30, 2017, and its English translation provided by WIPO.
Written Opinion of the International Search Authority for PCT/CN2016/079186, dated Jun. 30, 2016, and its English translation provided by WIPO.
From EPO Application No. 16795765.3, Supplementary European Search Report and Search Opinion dated May 15, 2018.
From TW Application No. 105112762, Office Action dated Apr. 12, 2017 with English translation from Google.
From CN 201510264054.3, First Office Action with Search Report, dated Oct. 31, 2018, with machine English translation from Global Dossier.
From JP 2017-560694, Japanese Office Action, dated Oct. 23, 2018, with machine English translation from the Japanese Patent Office.
Office Action from EP app. No. 16795765.3, dated May 21, 2019.

* cited by examiner

CHANNEL STATE INFORMATION ACQUISITION METHOD AND DEVICE

CROSS-REFERENCE TO RELATED APPLICATIONS

This application is the U.S. national phase of PCT Application No. PCT/CN2016/079186 filed on Apr. 13, 2016, which claims priority to Chinese Patent Application No. 201510264054.3 filed on May 21, 2015, the disclosures of which are incorporated herein by reference in their entireties.

TECHNICAL FIELD

The present disclosure relates to the field of communication technology, in particular to a channel state information (CSI) acquisition method and a CSI acquisition device.

BACKGROUND

In a conventional cellular system, antennae of an antenna array for a network side device (e.g., a base station) are usually arranged in a horizontal manner, e.g., a dual-polarized antenna array where the antennae are arranged in a horizontal manner as shown in FIG. 1A and an linear antenna array where the antennae are arranged in a horizontal manner as shown in FIG. 1B. A beam from a transmitting end of the network side device can merely be adjusted in a horizontal direction, and it has a fixed down-tilt angle in a vertical direction. Hence, various beamforming/precoding techniques are achieved on the basis of channel information in the horizontal direction. Actually, a radio signal is transmitted in a three-dimensional (3D) manner in the space, and it is impossible for a system with the fixed down-tilt angle to acquire optimum performance. The adjustment of the beam in the vertical direction plays a very important role in reducing inter-cell interference and improving the system performance. Along with the development of the antenna technology, an active antenna has been proposed so as to individually control each element. Through this antenna array (e.g., a dual-polarized antenna array where the antennae are arranged in both the horizontal direction and the vertical direction, i.e., in a 3D manner, as shown in FIG. 1C, and a linear antenna array where the antennae are arranged in both the horizontal direction and the vertical direction as shown in FIG. 1D), it is able to dynamically adjust the beam in the vertical direction.

For the 3D antenna array, a signal from the network side device can be beamformed not only in the horizontal direction but also in the vertical direction. In order to enable the network side device to determine a beamforming vector in the vertical direction and enable the beam in the vertical direction to be aligned with a User Equipment (UE), thereby to acquire a maximum beamforming gain, usually it is necessary for the UE to return CSI in the vertical direction.

In the case that the network side device supports a Full Dimension Multi-Input-Multi-Output (FD-MIMO) technique, i.e., supports a CSI beamforming transmission mode, it is necessary for the UE to report the CSI corresponding to an optimum CSI feedback configuration and position information about the CSI, so as to enable the network side device to acquire optimum beam information currently.

However, the UE does not support reporting the CSI corresponding to the optimum CSI feedback configuration and the position information about the CSI in a current aperiodic CSI feedback manner.

In a word, there is an urgent need to provide a CSI acquisition method and a CSI acquisition device, so as to enable the UE to support reporting the CSI corresponding to the optimum CSI feedback configuration and the position information about the CSI in an aperiodic CSI feedback manner.

SUMMARY (1) Technical Problem to be Solved

An object of the present disclosure is to provide a CSI acquisition method and a CSI acquisition device, so as to enable the UE to support reporting the CSI corresponding to the optimum CSI feedback configuration and the position information about the CSI in an aperiodic CSI feedback manner.

Technical Solution

In one aspect, the present disclosure provides in some embodiments a CSI acquisition method, including steps of: indicating, by a network side device, a CSI feedback configuration group for aperiodic CSI feedback to a UE; and transmitting, by the network side device, Downlink Control Information (DCI) to the UE, the DCI configured to indicate the UE to perform the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configurations in the corresponding CSI feedback configuration group; or a plurality of CSI feedback configuration groups is indicated by the network side device to the UE, and the DCI includes indication information that indicates one or more CSI feedback configuration groups in the plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicate the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the CSI feedback configuration group configured for the carrier set is indicated by the network side device to the UE.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In another aspect, the present disclosure provides in some embodiments a CSI feedback method, including steps of: receiving, by a UE, a CSI feedback configuration group for aperiodic CSI feedback indicated by a network side device; and receiving, by the UE, DCI from the network side device, and performing the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of sets of CSI feedback configuration groups is indicated by the network side device to the UE, and the DCI includes indication information that indicates one or more CSI feedback configuration groups in plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicate the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the indication information is received by the UE from the network side device, so as to indicate the CSI feedback configuration group configured for the carrier set.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In yet another aspect, the present disclosure provides in some embodiments a network side device, including: a first transmission unit configured to indicate a CSI feedback configuration group for aperiodic CSI feedback to a UE; and a second transmission unit configured to transmit DCI to the UE, the DCI configured to indicate the UE to perform the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicate the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the network side device further includes a third transmission unit configured to indicate the CSI feedback configuration group configured for the carrier set to the UE.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In still yet another aspect, the present disclosure provides in some embodiments a UE, including: a first reception unit configured to receive a CSI feedback configuration group for aperiodic CSI feedback indicated by a network side device; a second reception unit configured to receive DCI from the network side device; and a feedback unit configured to perform the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicate the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the UE further includes a third reception unit configured to receive the indication information from the network side device, so as to indicate the CSI feedback configuration group configured for the carrier set.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

(3) Beneficial Effect

According to the embodiments of the present disclosure, the network side device indicates the CSI feedback configuration group for the aperiodic CSI feedback to the UE, and transmits the DCI to the UE so as to indicate the UE to perform the aperiodic CSI feedback in accordance with the optimum CSI feedback configuration in the CSI feedback configuration group. As a result, it is able for the UE to report the CSI corresponding to the optimum CSI feedback configuration and the position information about the CSI in an aperiodic CSI feedback manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1A:
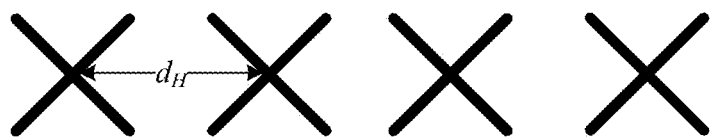
FIG. 1A is a schematic view showing a conventional dual-polarization antenna array where antennae are arranged in a horizontal direction.
Figure 1B:
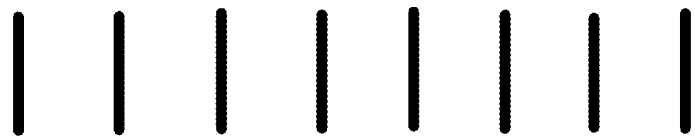
FIG. 1B is a schematic view showing a conventional linear antenna array where antennae are arranged in a horizontal direction.
Figure 1C:
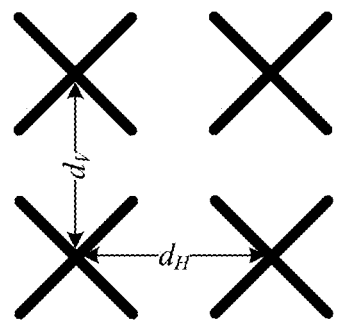
FIG. 1C is another schematic view showing the conventional dual-polarization antenna array where the antennae are arranged in both the horizontal direction and a vertical direction.
Figure 1D:
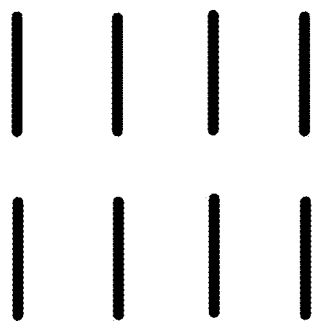
FIG. 1D is another schematic view showing the conventional linear antenna array where the antennae are arranged in both the horizontal direction and the vertical direction.

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

CSI may include a Channel Quality Indicator (CQI), a Precoding Matrix Indicator (PMI) and a Rank Indicator (RI).

A Long Term Evolution (LTE) system supports reporting periodic CSI and aperiodic CSI. Usually, the periodic CSI is reported through a Physical Uplink Control Channel (PUCCH), and the aperiodic CSI is reported through a Physical Uplink Shared Channel (PUSCH).

In order to support Coordinated Multi-Point (CoMP), a concept of CSI progress has been introduced into the LTE system. Each CSI progress may correspond to a Non-Zero Power CSI-Reference Signal (NZP CSI-RS) configuration and an Interference Measurement Resource (IMR) configuration. A UE may perform channel measurement in accordance with the NZP CSI-RS, and perform interference measurement in accordance with the IMR, so as to acquire, and feed back, the corresponding CSI for each progress. Each LTE UE may be configured with at most three CSI progresses for the CSI feedback.

The UE may perform the periodic CSI feedback on the basis of the PUCCH, or perform the aperiodic CSI feedback on the basis of the PUSCH. For the aperiodic CSI feedback, a network side device may trigger the UE to report the CSI corresponding to each CSI progress in a certain set of CSI progresses. The set of CSI progresses is pre-configured for the UE through high-layer signaling, and a triggering procedure is implemented through DCI. Through the configuration of a plurality of sets of CSI progresses, it is also able for the UE to feed back the CSI corresponding to a plurality of CSI-RSs beamformed by different vertical beamforming vectors.

According to the embodiments of the present disclosure, the network side device indicates a CSI feedback configuration group for the aperiodic CSI feedback to the UE, and transmits the DCI to the UE so as to indicate the UE to perform the aperiodic CSI feedback in accordance with an optimum CSI feedback configuration in the CSI feedback configuration group. As a result, it is able for the UE to report the CSI corresponding to the optimum CSI feedback configuration and the position information about the CSI in an aperiodic CSI feedback manner.

Figure 2:
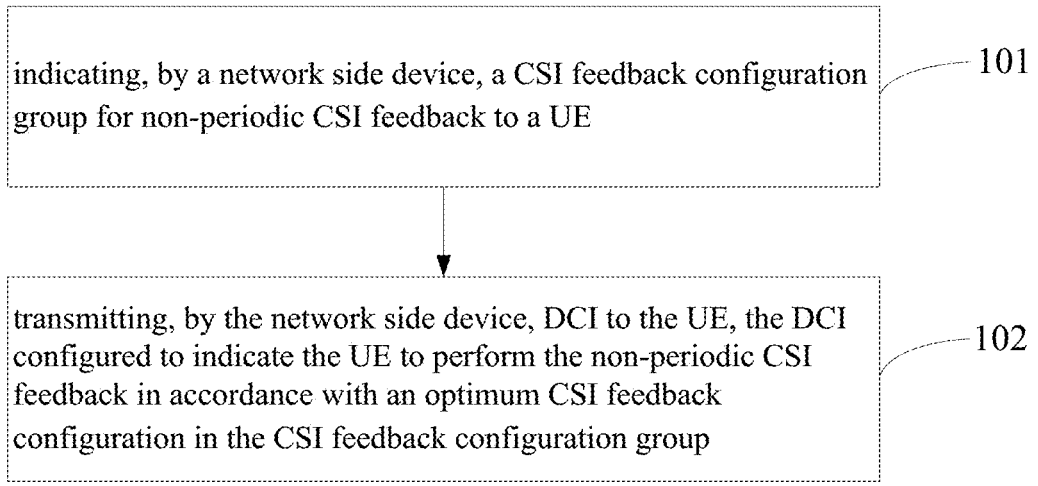
FIG. 2 is a flow chart of a CSI acquisition method implemented by a network side device according to one embodiment of the present disclosure.

The present disclosure provides in some embodiments a CSI acquisition method which, as shown in FIG. 2, includes: Step 101 of indicating, by a network side device, a CSI feedback configuration group for aperiodic CSI feedback to a UE; and Step 102 of transmitting, by the network side device, DCI to the UE, the DCI configured to indicate the UE to perform the aperiodic CSI feedback in accordance with an optimum CSI feedback configuration in the CSI feedback configuration group.

In Step 101, indication information about the CSI feedback configuration group for the aperiodic CSI feedback indicated by the network side device to the UE may be transmitted through high-layer signaling, i.e., the network side device may configure for the UE the CSI feedback configuration group for the CSI feedback through the high-layer signaling.

The CSI feedback configuration group has one or more of the following features. To be specific, (1) one or more CSI feedback configuration groups for the CSI feedback may be indicated by the network side device. For example, the network side device may configure for the UE three CSI feedback configuration groups. (2) One or more sets of CSI feedback configuration groups for the CSI feedback may be indicated by the network side device, and each set of CSI feedback configuration groups includes one or more CSI feedback configuration groups. For example, the network side device may configure for the UE three sets of CSI feedback configuration groups. (3) Each CSI feedback configuration group includes one or more CSI feedback configurations, and each CSI feedback configuration may be a CSI progress, an NZP CSI-RS resource configuration, or any other signal configuration for downlink measurement and CSI feedback. For example, each CSI feedback configuration group may include four NZP CSI-RS resource configurations. (4) Each CSI feedback configuration group includes configuration information associated with all the CSI feedback configurations in the CSI feedback configuration group, or configuration information associated with all the CSI progresses in the CSI feedback configuration group. For example, the CSI feedback configuration group may include, apart from the CSI feedback configurations, IMR configuration information associated with all the CSI feedback configurations. (5) In the case of multiple carriers, the network side device configures one CSI feedback configuration group for each carrier, or configured one CSI feedback configuration group for all the carriers. (6) The NZP CSI-RSs in different CSI feedback configurations may be beamformed using different beamforming vectors.

In Step 102, the network side device may trigger the UE to perform the aperiodic CSI feedback through the DCI, and the UE may then perform the CSI feedback in accordance with the optimum CSI feedback configuration in the CSI feedback configuration group.

In Step 102, the DCI from the network side device includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In Step 102, in the case that the network side device indicates, through the indication information in the DCI, the UE to feed back the CSI acquired through CSI measurement performed in accordance with the optimum CSI feedback configuration in the CSI feedback configuration group and the position information about the optimum CSI feedback configuration in the CSI feedback configuration group, one of the following modes a1 to a5 may be applied.

Mode a1: one CSI feedback configuration group is indicated by the network side device to the UE. In this case, the DCI transmitted by the network side device to the UE includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, in order to reduce network resource overhead, the indication information is a bit sequence having one bit. For example, in the case that the bit sequence has a value of 1 or 0, it means that the UE feeds back the CSI acquired through the CSI measurement performed in accordance with the optimum CSI feedback configuration in the CSI feedback configuration group and the position information about the optimum CSI feedback configuration in the CSI feedback configuration group.

Mode a2: a plurality of CSI feedback configuration groups is indicated by the network side device to the UE. In this case, the DCI transmitted by the network side device to the UE includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group.

In a possible embodiment of the present disclosure, in order to reduce the network resource overhead, the indication information is a bit sequence having two bits, and the network side device may indicate, through the bit sequence having two bits, the UE to feed back the CSI acquired through the CSI measurement in accordance with the optimum CSI feedback configuration in each CSI feedback configuration group and the position information about the optimum CSI feedback configuration in the CSI feedback configuration group, or indicate, through the bit sequence having two bits, the UE not to perform the aperiodic CSI feedback. Table 1 shows the indication information.

TABLE 1

| indication information in DCI | |
|---|---|
| Indication information | Meaning |
| 00 | Other use |
| 01 | Other use |
| 10 | Feeding back CSI acquired through CSI measurement in accordance with an optimum CSI feedback configuration in each CSI feedback configuration group and position information about the optimum CSI feedback configuration in the CSI feedback configuration group |
| 11 | Not performing the aperiodic CSI feedback |

In Table 1, in the case that the bit sequence having two bits is 00 or 01, it represents "the other use"; in the case that the bit sequence having two bits is 10, it represents "feeding back CSI acquired through CSI measurement in accordance with an optimum CSI feedback configuration in each CSI feedback configuration group and position information about the optimum CSI feedback configuration in the CSI feedback configuration group"; and in the case that the bit sequence having two bits is 11, it represents "not performing the aperiodic CSI feedback".

The definitions of the values of the indication information in Table 1 are merely for illustrative purposes only, and any other definition modes may also be applied, which will not be particularly defined herein.

Mode a3: a plurality of CSI feedback configuration groups is indicated by the network side device to the UE. In this case, the DCI transmitted by the network side device to the UE includes indication information that indicates one or more CSI feedback configuration groups in plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group.

In a possible embodiment of the present disclosure, in order to reduce the network resource overhead, the indication information is a bit sequence having two bits, and the network side device may indicate, through the bit sequence having two bits, one or more CSI feedback configuration groups in the plurality of CSI feedback configuration groups, and indicate the UE to feed back the CSI acquired through the CSI measurement in accordance with the optimum CSI feedback configuration in the CSI feedback configuration group and the position information about the optimum CSI feedback configuration in the CSI feedback configuration group, or indicate through the bit sequence having two bits the UE not to perform the aperiodic CSI feedback. Table 2 shows the indication information.

TABLE 2

Indication information in DCI

| Indication information | Meaning |
| --- | --- |
| 00 | Feeding back CSI acquired through CSI measurement in accordance with an optimum CSI feedback configuration in a first CSI feedback configuration group and position information about the optimum CSI feedback configuration in the first CSI feedback configuration group |
| 01 | Feeding back CSI acquired through CSI measurement in accordance with an optimum CSI feedback configuration in a second CSI feedback configuration group and position information about the optimum CSI feedback configuration in the second CSI feedback configuration group |
| 10 | Feeding back CSI acquired through CSI measurement in accordance with an optimum CSI feedback configuration in a third CSI feedback configuration group and position information about the optimum CSI feedback configuration in the third CSI feedback configuration group |
| 11 | Not performing aperiodic CSI feedback |

In Table 2, in the case that the bit sequence having two bits is 00, it represents "feeding back CSI acquired through CSI measurement in accordance with an optimum CSI feedback configuration in a first CSI feedback configuration group and position information about the optimum CSI feedback configuration in the first CSI feedback configuration group"; in the case that the bit sequence having two bits is 01, it represents "feeding back CSI acquired through CSI measurement in accordance with an optimum CSI feedback configuration in a second CSI feedback configuration group and position information about the optimum CSI feedback configuration in the second CSI feedback configuration group"; in the case that the bit sequence having two bits is 10, it represents "feeding back CSI acquired through CSI measurement in accordance with an optimum CSI feedback configuration in a third CSI feedback configuration group and position information about the optimum CSI feedback configuration in the third CSI feedback configuration group"; and in the case that the bit sequence having two bits is 11, it represents "not performing the aperiodic CSI feedback".

The definitions of the values of the indication information in Table 2 are merely for illustrative purposes only, and any other definition modes may also be applied, which will not be particularly defined herein.

Mode a4: the network side device configures for the UE one or more carrier sets. Hence, the network side device further indicates a CSI feedback configuration group for each carrier set through the high-layer signaling or any other ways.

A plurality of CSI feedback configuration groups is indicated by the network side device to the UE. In this case, the DCI transmitted by the network side device to the UE includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group.

In a possible embodiment of the present disclosure, in order to reduce the network resource overhead, the indication information is a bit sequence having two bits. The network side device may indicate, through the bit sequence having two bits, one carrier set and indicate the UE to feed back the CSI acquired through the CSI measurement in accordance with the optimum CSI feedback configuration in the CSI feedback configuration group corresponding to the carrier set and the position information about the optimum CSI feedback configuration in the CSI feedback configuration group, or indicate through the bit sequence having two bits the UE not to perform the aperiodic CSI feedback. Table 3 shows the indication information.

TABLE 3

Indication information in DCI

| Indication information | Meaning |
| --- | --- |
| 00 | Feeding back CSI acquired through CSI measurement in accordance with an optimum CSI feedback configuration in one of CSI feedback configuration groups corresponding to a first carrier set and position information about the optimum CSI feedback configuration in the CSI feedback configuration group |
| 01 | Feeding back CSI acquired through CSI measurement in accordance with an optimum CSI feedback configuration in one of CSI feedback configuration groups corresponding to a second carrier set and position information about the optimum CSI feedback configuration in the CSI feedback configuration group |

TABLE 3-continued

Indication information in DCI

| Indication information | Meaning |
|---|---|
| 10 | Feeding back CSI acquired through CSI measurement in accordance with an optimum CSI feedback configuration in one of CSI feedback configuration groups corresponding to a third carrier set and position information about the optimum CSI feedback configuration in the CSI feedback configuration group |
| 11 | Not performing aperiodic CSI feedback |

In table 3, in the case that the bit sequence having two bits is 00, it represents "feeding back CSI acquired through CSI measurement in accordance with an optimum CSI feedback configuration in one of CSI feedback configuration groups corresponding to a first carrier set and position information about the optimum CSI feedback configuration in the CSI feedback configuration group"; in the case that the bit sequence having two bits is 01, it represents "feeding back CSI acquired through CSI measurement in accordance with an optimum CSI feedback configuration in one of CSI feedback configuration groups corresponding to a second carrier set and position information about the optimum CSI feedback configuration in the CSI feedback configuration group"; in the case that the bit sequence having two bits is 10, it represents "feeding back CSI acquired through CSI measurement in accordance with an optimum CSI feedback configuration in one of CSI feedback configuration groups corresponding to a third carrier set and position information about the optimum CSI feedback configuration in the CSI feedback configuration group"; and in the case that the bit sequence having two bits is 11, it represents "not performing the aperiodic CSI feedback".

The definitions of the values of the indication information in Table 3 are merely for illustrative purposes only, and any other definition modes may also be applied, which will not be particularly defined herein.

Mode a5: a plurality of sets of CSI feedback configuration groups is indicated by the network side device to the UE. In this case, the DCI transmitted by the network side device to the UE includes indication information that indicates one set of CSI feedback configuration groups in the plurality of sets of CSI feedback configuration groups, and indicates the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, in order to reduce the network resource overhead, the indication information is a bit sequence having two bits. The network side device may indicate through the bit sequence having two bits one set of CSI feedback configuration groups among the plurality of sets of CSI feedback configuration groups and indicate the UE to feed back CSI acquired through CSI measurement in accordance with an optimum CSI feedback configuration in each CSI feedback configuration group in the set of CSI feedback configuration groups and position information about the optimum CSI feedback configuration in the CSI feedback configuration group, or indicate through the bit sequence having two bits the UE not to perform the aperiodic CSI feedback. The set of CSI feedback configuration groups is indicated by the network side device to the UE, and includes one or more CSI feedback configuration groups. Table 4 shows the indication information.

TABLE 4

Indication information in DCI

| Indication information | Meaning |
|---|---|
| 00 | Feeding back CSI acquired through CSI measurement in accordance with an optimum CSI feedback configuration in each CSI feedback configuration group in a first set of CSI feedback configuration groups and position information about the optimum CSI feedback configuration in the CSI feedback configuration group |
| 01 | Feeding back CSI acquired through CSI measurement in accordance with an optimum CSI feedback configuration in each CSI feedback configuration group in a second set of CSI feedback configuration groups and position information about the optimum CSI feedback configuration in the CSI feedback configuration group |
| 10 | Feeding back CSI acquired through CSI measurement in accordance with an optimum CSI feedback configuration in each CSI feedback configuration group in a third set of CSI feedback configuration groups and position information about the optimum CSI feedback configuration in the CSI feedback configuration group |
| 11 | Not performing aperiodic CSI feedback |

In Table 4, in the case that the bit sequence having two bits is 00, it represents "feeding back CSI acquired through CSI measurement in accordance with an optimum CSI feedback configuration in each CSI feedback configuration group in a first set of CSI feedback configuration groups and position information about the optimum CSI feedback configuration in the CSI feedback configuration group"; in the case that the bit sequence having two bits is 01, it represents "feeding back CSI acquired through CSI measurement in accordance with an optimum CSI feedback configuration in each CSI feedback configuration group in a second set of CSI feedback configuration groups and position information about the optimum CSI feedback configuration in the CSI feedback configuration group"; in the case that the bit sequence having two bits is 10, it represents "feeding back CSI acquired through CSI measurement in accordance with an optimum CSI feedback configuration in each CSI feedback configuration group in a third set of CSI feedback configuration groups and position information about the optimum CSI feedback configuration in the CSI feedback configuration group"; and in the case that the bit sequence having two bits is 11, it represents "not performing the aperiodic CSI feedback".

The definitions of the values of the indication information in Table 4 are merely for illustrative purposes only, and any other definition modes may also be applied, which will not be particularly defined herein.

Further, one or more optimum CSI feedback configurations may be included in one CSI feedback configuration group. The number of the optimum CSI feedback configurations in one CSI feedback configuration group may be pre-defined at a network side and a UE side, or indicated by the network side device to the UE.

To be specific, the network side device may indicate the number of the optimum CSI feedback configurations in the CSI feedback configuration group to the UE in one of the following modes b1 to b3.

Mode b1: the number of the optimum CSI feedback configurations in the CSI feedback configuration group may be indicated by the indication information in the DCI transmitted by the network side device. For example, the number of the optimum CSI feedback configurations in the CSI feedback configuration group may be indicated in the DCI through information having one bit.

Mode b2: the number of the optimum CSI feedback configurations in one CSI feedback configuration group, as a configuration parameter, may be contained in configuration parameters of the CSI feedback configuration group. In a possible embodiment of the present disclosure, the number of the optimum CSI feedback configurations in the CSI feedback configuration group may be indicated as the configuration parameter of the CSI feedback configuration group to the UE. For example, the configuration parameter of the CSI feedback configuration group for the CSI feedback further includes the number of the optimum CSI feedback configuration in the CSI feedback configuration group.

Mode b3: the number of the optimum CSI feedback configurations in one CSI feedback configuration group, as a configuration parameter, is contained in configuration parameters of a set of CSI feedback configuration groups to which the CSI feedback configuration group belongs, and the number of the optimum CSI feedback configurations in all the CSI feedback configuration groups in each set of CSI feedback configuration groups is identical.

Subsequent to Step 102, the UE may, in accordance with the CSI feedback configuration group configured by the network side device for the aperiodic CSI feedback and the DCI transmitted by the network side device, feed back the CSI acquired through the CSI measurement in accordance with the optimum CSI feedback configuration in the CSI feedback configuration group and the position information about the optimum CSI feedback configuration in the CSI feedback configuration group.

The position information about the optimum CSI feedback configuration in the CSI feedback configuration group refers to an index of the optimum CSI feedback configuration in the CSI feedback configuration group. The UE may report the index of the optimum CSI feedback configuration in the CSI feedback configuration group.

The position information about the optimum CSI feedback configuration in the CSI feedback configuration group may also be represented by a bitmap. In other words, each CSI feedback configuration group corresponds to one position sequence, and each CSI feedback configuration in the CSI feedback configuration group corresponds to one position in the position sequence. The position information about the optimum CSI feedback configuration in the CSI feedback configuration group refers to a bit value of a corresponding position of the optimum CSI feedback configuration in the position sequence of the CSI feedback configuration group. For example, a bit value of a corresponding position of the optimum CSI feedback configuration in the position sequence of the CSI feedback configuration group may be set as 1, and bit values of the other positions in the position sequence may be set as 0. At this time, the position information about the optimum CSI feedback configuration in the CSI feedback configuration group may be determined in accordance with the bit value in the position sequence.

Upon the receipt of the CSI acquired through the CSI measurement in accordance with the optimum CSI feedback configuration in the CSI feedback configuration group and the position information about the optimum CSI feedback configuration in the CSI feedback configuration group, the network side device may further perform downlink precoding in accordance with the CSI corresponding to the optimum CSI feedback configuration and the position information thereof. To be specific, the network side device may perform a precoding operation in a first dimension in accordance with the CSI, and perform a precoding operation in a second dimension using a beamforming vector corresponding to the position information about the optimum CSI feedback configuration in the CSI feedback configuration group. Then, the network side device may perform a beamforming operation in both a horizontal direction and a vertical direction in accordance with the precoding operations in the two dimensions. As a result, it is able to acquire a larger beamforming gain, thereby to improve the system spectral efficiency.

Upon the receipt of the CSI acquired through the CSI measurement in accordance with the optimum CSI feedback configuration in the CSI feedback configuration group and the position information about the optimum CSI feedback configuration in the CSI feedback configuration group, the network side device may further update CSI feedback configuration information of the PUCCH in accordance with the position information about the optimum CSI feedback configuration in the CSI feedback configuration group, so as to update the CSI feedback configuration for the periodic CSI feedback.

As mentioned above, the network side device may indicate to the UE the CSI feedback configuration group for the aperiodic CSI feedback, and the UE may determine the optimum CSI feedback configuration from the CSI feedback configuration group indicated by the network side device in accordance with the DCI from the network side device, so as to perform the aperiodic CSI feedback. As a result, it is able for the UE to support reporting the CSI corresponding to the optimum CSI feedback configuration and the position information about the optimum CSI feedback configuration in an aperiodic CSI feedback manner. In addition, the network side device may determine optimum beamforming vectors in both the horizontal direction and the vertical direction in accordance with the CSI corresponding to the optimum CSI feedback configuration and the position information thereof, so as to acquire a larger beamforming gain, thereby to improve the system spectral efficiency.

Figure 3:
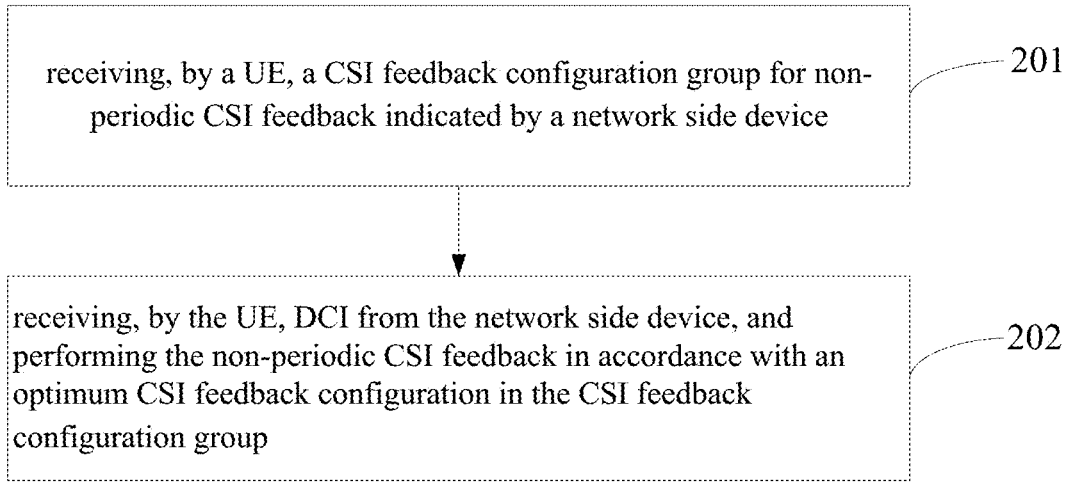
FIG. 3 is a flow chart of a CSI feedback method implemented by a UE according to one embodiment of the present disclosure.

Based on an identical inventive concept, the present disclosure further provides in some embodiments a CSI feedback method which, as shown in FIG. 3, includes: Step 201 of receiving, by a UE, a CSI feedback configuration group for aperiodic CSI feedback indicated by a network side device; and Step 202 of receiving, by the UE, DCI from the network side device, and performing the aperiodic CSI feedback in accordance with an optimum CSI feedback configuration in the CSI feedback configuration group.

In Step 201, the CSI feedback configuration group for the aperiodic CSI feedback may be received by the UE from the network side device through high-layer signaling.

The CSI feedback configuration group indicated by the network side device includes one or more of the above-mentioned features, and thus will not be particularly defined herein.

In Step 202, the UE receive the DCI from the network side device, and feedback the optimum CSI feedback configuration in the CSI feedback configuration group in accordance with the DCI, so as to perform the aperiodic CSI feedback.

In Step 202, the DCI received by the UE from the network side device includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In Step 202, the modes in which the UE, on the basis of the indication information in the DCI received from the network side device, feeds back the CSI acquired through the CSI measurement in accordance with the optimum CSI feedback configuration in the CSI feedback configuration group and the position of the optimum CSI feedback configuration in the CSI feedback configuration group have been described hereinabove, and thus will not be particularly defined herein.

Further, one or more optimum CSI feedback configurations may be included in one CSI feedback configuration group. The number of the optimum CSI feedback configurations in one CSI feedback configuration group may be pre-defined at the network side and the UE side, or indicated by the network side device to the UE, and the UE may feed back the number of the optimum CSI feedback configurations in the CSI feedback configuration group, which have been described hereinabove and thus will not be particularly defined herein.

In Step 202, the UE may determine the optimum CSI feedback configuration in one CSI feedback configuration group in the following modes c1 to c3.

Mode c1: the UE may perform Reference Signal Received Power (RSRP) measurement in accordance with each CSI feedback configuration in the CSI feedback configuration group to determine the CSI feedback configuration corresponding to each RSRP measurement value, and select the CSI feedback configuration corresponding to the largest RSRP measurement value as the optimum CSI feedback configuration in the CSI feedback configuration group.

Mode c2: the UE may perform CQI estimation on each CSI feedback configuration in the CSI feedback configuration group to determine the CSI feedback configuration corresponding to each CQI estimation value, and select the CSI feedback configuration corresponding to the largest CQI estimation value and the optimum CSI feedback configuration in the CSI feedback configuration group.

Mode c3: the UE may perform CSI measurement in accordance with each CSI feedback configuration in the CSI feedback configuration group to determine a CSI measurement value corresponding to each CSI feedback configuration and a Transport Block size (TBsize) corresponding to each CSI measurement value, and select the CSI feedback configuration corresponding to the largest TBsize as the optimum CSI feedback configuration in the CSI feedback configuration group.

In Step 202, in the case that the UE needs to feed back to the network side device the CSI acquired through the CSI measurement in accordance with a plurality of optimum CSI feedback configurations in the CSI feedback configuration groups and the position information about the optimum CSI feedback configurations in the CSI feedback configuration groups, it may combine the CSI corresponding to the optimum CSI feedback configuration in each CSI feedback configuration group and the position information thereof sequentially, and then feed them back to the network side device. For example, the UE may feed back the CSI and the position information to the network side device in such a manner as "{an index of CSI feedback configuration group 1, an index of CSI feedback configuration group 2, . . . }". The combination of index information about the plurality of optimum CSI feedback configurations will not be particularly defined herein.

Subsequent to Step 202, the UE may feed back the CSI acquired through the CSI measurement in accordance with the optimum CSI feedback configuration in the CSI feedback configuration group and the position information about the optimum CSI feedback configuration in the CSI feedback configuration group. The determination of the position information about the optimum CSI feedback configuration in the CSI feedback configuration group has been described hereinabove, and thus will not be particularly defined herein.

Subsequent to Step 202, upon the determination of the position information about the optimum CSI feedback configuration in the CSI feedback configuration group, the UE may perform a cascaded encoding operation on the determined position information about the optimum CSI feedback configuration and a Rank Indicator (RI) thereof in the CSI feedback configuration group, and then perform a resource mapping operation in accordance with a resource mapping mode of the RI; or perform a joint encoding operation on the position information about the optimum CSI feedback configuration and the RI thereof in the CSI feedback configuration group, and then perform a resource mapping operation in accordance with a resource mapping mode of the RI.

Upon the determination of the position information about the optimum CSI feedback configuration in the CSI feedback configuration group, the UE may perform a cascaded encoding operation on the determined position information about the optimum CSI feedback configuration in the CSI feedback configuration group and a CQI of the optimum CSI feedback configuration in the CSI feedback configuration group, multiplex the resultant information with data, and then perform a resource mapping operation in accordance with a resource mapping mode of the CQI; or perform a joint encoding operation on the determined position information about the optimum CSI feedback configuration in the CSI feedback configuration group and the CQI of the optimum CSI feedback configuration in the CSI feedback configuration group, multiplex the resultant information with data, and then perform a resource mapping operation in accordance with a resource mapping mode of the CQI.

As mentioned above, the network side device may indicate to the UE the CSI feedback configuration group for the aperiodic CSI feedback, and the UE may determine the optimum CSI feedback configuration from the CSI feedback configuration group indicated by the network side device in accordance with the DCI from the network side device, so as to perform the aperiodic CSI feedback. As a result, it is able for the UE to support reporting the CSI corresponding to the optimum CSI feedback configuration and the position information about the optimum CSI feedback configuration in an aperiodic CSI feedback manner. In addition, the network side device may determine optimum beamforming vectors in both the horizontal direction and the vertical direction in accordance with the CSI corresponding to the optimum CSI feedback configuration and the position information thereof, so as to acquire a larger beamforming gain, thereby to improve the system spectral efficiency.

The CSI acquisition method in the embodiments of the present disclosure will be described hereinafter in more details.

First Embodiment

The network side device may indicate three CSI feedback configurations for the aperiodic CSI feedback to the UE through high-layer signaling, and each CSI feedback configuration includes one CSI-RS configuration and one IMR configuration. The CSI-RSs in the CSI feedback configurations may be beamformed using different vertical beamforming vectors.

The network side device may schedule the DCI for the PDSCH, so as to trigger the UE to perform the aperiodic CSI feedback. The trigger signaling includes one bit. In the case that the indication information is 0, it is unnecessary for the UE to perform the aperiodic CSI feedback, and in the case that the indication information is 1, it is necessary for the UE to perform the aperiodic CSI feedback.

In the case that the bit in the DCI trigger signaling has a value of 1, upon the receipt of the trigger signaling, the UE may perform the CSI measurement in accordance with the three CSI feedback configurations configured by the network side device, so as to acquire the RI, PMI and CQI corresponding to each CSI feedback configuration, and calculate the TBsize corresponding to each CSI feedback configuration in accordance with the CSI measurement value.

The UE may select the CSI feedback configuration corresponding to the largest TBsize as the optimum CSI feedback configuration, and report the measured RI, PMI and CQI as well as an index of the optimum CSI feedback configuration in the CSI feedback configuration group to a base station.

To be specific, a joint encoding operation may be performed on the index and the RI, and then the encoded data may be mapped to a physical resource reserved for the RI. The resource in an LTE system may be further extended, so as to support more bits.

Upon the receipt of the RI, PMI and CQI, the base station may perform a data precoding operation in the horizontal direction in accordance with the PMI, and select a vertical beamforming vector of the CSI-RS in the CSI feedback configuration corresponding to the index as the vertical beamforming vector of the data.

Second Embodiment

The network side device may determine a set of transmission points for the CoMP and a set of carriers, and determine the CSI feedback configuration group corresponding to each transmission point in the set of transmission points. Each transmission point may correspond to different CSI feedback configuration groups or an identical CSI feedback configuration group on different carriers, and all the CSI feedback configuration groups form a total set of CSI feedback configuration groups.

The network side device may indicate three sets of CSI feedback configuration groups for the aperiodic CSI feedback, and each of the three sets may be a subset of the above-mentioned total set. Each CSI feedback configuration group corresponds to one transmission point and one carrier. Each CSI feedback configuration group may include one or more CSI feedback configurations. For example, each CSI feedback configuration group may include a plurality of CSI-RS configurations, and each CSI-RS configuration may correspond to an identical IMR configuration.

The base station may schedule the DCI for the PDSCH to trigger the UE to perform the aperiodic CSI feedback. The trigger signaling includes indication information having two bits, which are shown in Table 5.

TABLE 5

Indication information having two bits

| Indication information | Meaning |
| --- | --- |
| 00 | Feeding back CSI acquired in accordance with an optimum CSI feedback configuration in each CSI feedback configuration group in a first set of CSI feedback configuration groups and position information about the optimum CSI feedback configuration in the CSI feedback configuration group |
| 01 | Feeding back CSI acquired in accordance with an optimum CSI feedback configuration in each CSI feedback configuration group in a second set of CSI feedback configuration groups and position information about the optimum CSI feedback configuration in the CSI feedback configuration group |
| 10 | Feeding back CSI acquired in accordance with an optimum CSI feedback configuration in each CSI feedback configuration group in a third set of CSI feedback configuration groups and position information about the optimum CSI feedback configuration in the CSI feedback configuration group |
| 11 | Not performing the aperiodic CSI feedback |

In the case that the UE has received the trigger signaling "10", it may perform the RSRP measurement on the CSI-RS of each CSI feedback configuration in the third set of CSI feedback configuration group, and select the CSI-RS configuration corresponding to the largest RSRP value as the optimum CSI-RS configuration; or perform CQI estimation on the CSI-RS of each CSI feedback configuration in the third set of CSI feedback configuration group, and select the CSI-RS configuration corresponding to the largest CQI estimation value as the optimum CSI-RS configuration; or perform the CSI measurement on the CSI-RS of each CSI feedback configuration in the third set of CSI feedback configuration group, and select the CSI-RS configuration corresponding to the largest TBsize acquired after the CSI measurement as the optimum CSI-RS configuration.

The UE may perform the CSI measurement in accordance with the optimum CSI-RS configuration in each CSI feedback configuration group, so as to acquire the RI, PMI and CQI as well as an index of each configuration group.

The UE may perform a cascading operation on the RI, PMI, CQI and the index of the optimum CSI-RS configuration, and report the resultant data to the base station. To be specific, the UE may report the resultant data in the following order: {an index of CSI feedback configuration group 1, RI, PMI and CQI of CSI feedback configuration group 1, an index of CSI feedback configuration group 2, RI, PMI and CQI of CSI feedback configuration group 2, . . . }.

Upon the receipt of the RI, PMI, CQI and the index of each configuration group, the base station may find out an optimum configuration group from the configuration groups corresponding to the transmission points in the set of transmission points in accordance with the CSI corresponding to the configuration groups, and select the transmission point corresponding to the optimum configuration group as a PDSCH transmission point for the UE. At this time, a CSI corresponding to the optimum configuration may serve as the CSI for the downlink transmission, and a beamforming vector of the CSI-RS indicated by the index corresponding to the optimum configuration group may be used as the beamforming vector for the downlink transmission.

Figure 4:
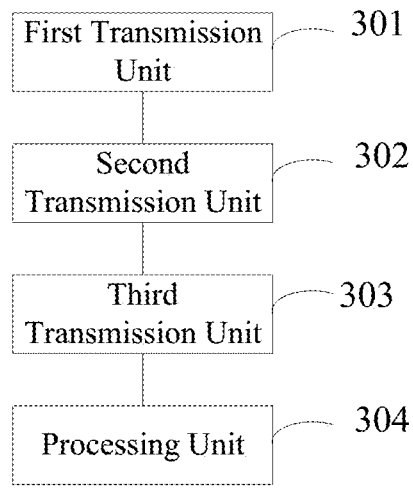
FIG. 4 is a schematic view showing a network side device according to one embodiment of the present disclosure.

Based on an identical concept, the present disclosure further provides in some embodiments a network side device for implementing the above-mentioned method which, as shown in FIG. 4 includes a first transmission unit 301, a second transmission unit 302, a third transmission unit 303 and a processing unit 304. The first transmission unit 301 is configured to indicate a CSI feedback configuration group for aperiodic CSI feedback to a UE. The second transmission unit 302 is configured to transmit DCI to the UE, the DCI configured to indicate the UE to perform the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, the position information about the optimum CSI feedback configuration in the CSI feedback configuration group includes: an index of the optimum CSI feedback configuration in the CSI feedback configuration group; or a bit value of a position of the optimum CSI feedback configuration in a position sequence of the CSI feedback configuration group. Each CSI feedback configuration in the CSI feedback configuration group corresponds to one position in the position sequence.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicates the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicate the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicate the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the third transmission unit 303 is configured to indicate the CSI feedback configuration group configured for the carrier set to the UE.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In a possible embodiment of the present disclosure, the processing unit 304 is configured to perform a downlink precoding operation in accordance with the CSI corresponding to the optimum CSI feedback configuration and the position information thereof, or update CSI feedback configuration information about a PUCCH in accordance with the position information about the optimum CSI feedback configuration.

In a possible embodiment of the present disclosure, each carrier corresponds to one CSI feedback configuration group, or all the carriers correspond to one CSI feedback configuration group.

Figure 5:
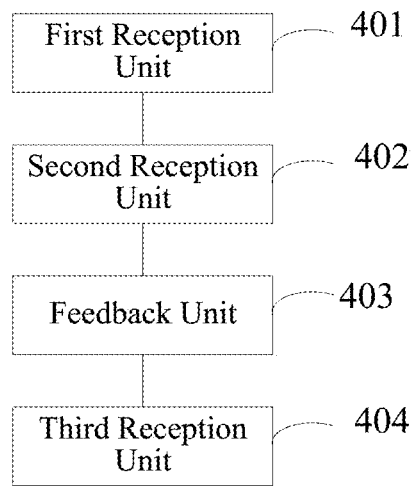
FIG. 5 is a schematic view showing a UE according to one embodiment of the present disclosure.

Based on an identical inventive concept, the present disclosure further provides in some embodiments a UE for implementing the above-mentioned method which, as shown in FIG. 5, includes a first reception unit 401, a second reception unit 402, a feedback unit 403 and a third reception unit 404. The first reception unit 401 is configured to receive a CSI feedback configuration group for aperiodic CSI feedback indicated by a network side device. The second reception unit 402 is configured to receive DCI from the network side device. The feedback unit 403 is configured to perform the aperiodic CSI feedback in accordance with an optimum CSI feedback configuration in the CSI feedback configuration group.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, the position information about the optimum CSI feedback configuration in the CSI feedback configuration group includes: an index of the optimum CSI feedback configuration in the CSI feedback configuration group; or a bit value of a position of the optimum CSI feedback configuration in a position sequence of the CSI feedback configuration group. Each CSI feedback configuration in the CSI feedback configuration group corresponds to one position in the position sequence.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicate the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicates the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the third reception unit 404 is configured to receive the indication information from the network side device, so as to indicate the CSI feedback configuration group configured for the carrier set.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In a possible embodiment of the present disclosure, each carrier corresponds to one CSI feedback configuration group, or all the carriers correspond to one CSI feedback configuration group.

Figure 6:
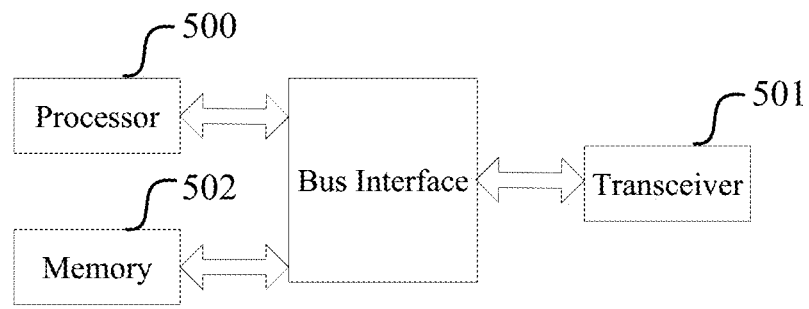
FIG. 6 is another schematic view showing the network side device according to one embodiment of the present disclosure.

Based on an identical inventive concept, the present disclosure further provides in some embodiments a network side device for implementing the above-mentioned method which, as shown in FIG. 6, includes a processor 500, a transceiver 501 and a memory 502. The processor 500 is configured to read a program stored in the memory 502, so as to: indicate a CSI feedback configuration group for aperiodic CSI feedback to a UE; and transmit DCI to the UE, the DCI configured to indicate the UE to perform the aperiodic CSI feedback in accordance with an optimum CSI feedback configuration in the CSI feedback configuration group. The transceiver 501 is configured to receive and transmit data under the control of the processor 500.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, the position information about the optimum CSI feedback configuration in the CSI feedback configuration group includes: an index of the optimum CSI feedback configuration in the CSI feedback configuration group; or a bit value of a position of the optimum CSI feedback configuration in a position sequence of the CSI feedback configuration group. Each CSI feedback configuration in the CSI feedback configuration group corresponds to one position in the position sequence.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicates the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicate the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicates the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the processor 500 is further configured to indicate the CSI feedback configuration group configured for the carrier set to the UE.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In a possible embodiment of the present disclosure, the processor 500 is configured to perform a downlink precoding operation in accordance with the CSI corresponding to the optimum CSI feedback configuration and the position information thereof, or update CSI feedback configuration information about a PUCCH in accordance with the position information about the optimum CSI feedback configuration.

In a possible embodiment of the present disclosure, each carrier corresponds to one CSI feedback configuration group, or all the carriers correspond to one CSI feedback configuration group.

In FIG. 6, bus architecture may include a number of buses and bridges connected to each other, so as to connect various circuits for one or more processors 500 and one or more memories 502. In addition, as is known in the art, the bus architecture may be used to connect any other circuits, such as a circuit for a peripheral device, a circuit for a voltage stabilizer and a power management circuit. Bus interfaces are provided, and the transceiver 501 may consist of a plurality of elements, i.e., a transmitter and a receiver for communication with any other devices over a transmission medium. The processor 500 may take charge of managing the bus architecture as well as general processings. The memory 502 may store therein data for the operation of the processor 500.

Figure 7:
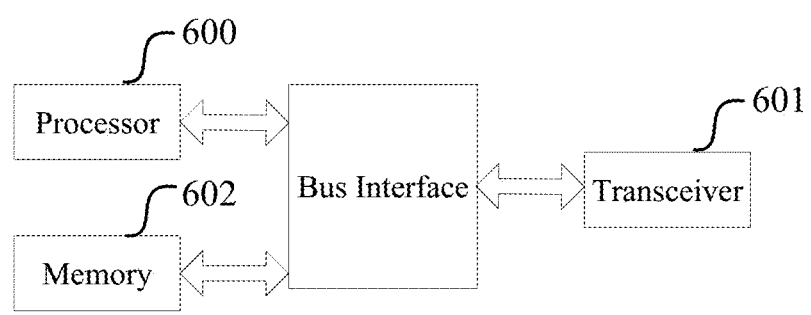
FIG. 7 is another schematic view showing the UE according to one embodiment of the present disclosure.

Based on an identical inventive concept, the present disclosure provides in some embodiments a UE for implementing the above-mentioned method which, as shown in FIG. 7, includes a processor 600, a transceiver 601 and a memory 602. The processor 600 is configured to read a program stored in the memory 602, so as to: receive a CSI feedback configuration group for aperiodic CSI feedback indicated by a network side device; and receive DCI from the network side device and perform the aperiodic CSI feedback in accordance with an optimum CSI feedback configuration in the CSI feedback configuration group. The transceiver 601 is configured to receive and transmit data under the control of the processor 600.

In a possible embodiment of the present disclosure, the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group.

In a possible embodiment of the present disclosure, the position information about the optimum CSI feedback configuration in the CSI feedback configuration group includes: an index of the optimum CSI feedback configuration in the CSI feedback configuration group; or a bit value of a position of the optimum CSI feedback configuration in a position sequence of the CSI feedback configuration group. Each CSI feedback configuration in the CSI feedback configuration group corresponds to one position in the position sequence.

In a possible embodiment of the present disclosure, one CSI feedback configuration group is indicated by the network side device to the UE, and the DCI includes indication information that indicates the UE to feed back CSI acquired through CSI measurement performed in accordance with the optimum CSI feedback configuration in the CSI feedback configuration group and position information about the optimum CSI feedback configuration in the CSI feedback configuration group; or a plurality of CSI feedback configuration groups is indicated by the network side device to the UE, and the DCI includes indication information that indicates the UE to feed back CSI acquired through CSI measurement performed in accordance with an optimum CSI feedback configuration in each CSI feedback configuration group and position information about the optimum CSI feedback configuration in the CSI feedback configuration group; or a plurality of CSI feedback configuration groups is indicated by the network side device to the UE, and the DCI includes indication information that indicates one or more CSI feedback configuration groups in plurality of the CSI feedback configuration groups, and indicates the UE to feed back CSI acquired through CSI measurement performed in accordance with an optimum CSI feedback configuration in one of the one or more CSI feedback configuration groups and position information about the optimum CSI feedback configuration in the CSI feedback configuration group; or a plurality of CSI feedback configuration groups is indicated by the network side device to the UE, each CSI feedback configuration group corresponds to one carrier set, and the DCI includes indication information that indicates one carrier set, and indicates the UE to feed back CSI acquired through CSI measurement performed in accordance with an optimum CSI feedback configuration in the CSI feedback configuration group corresponding to the carrier set and position information about the optimum CSI feedback configuration in the CSI feedback configuration group; or a plurality of sets of CSI feedback configuration groups is indicated by the network side device to the UE, and the DCI includes indication information that indicates one set of CSI feedback configuration groups in the plurality of sets of CSI feedback configuration groups, and indicates the UE to feed back CSI acquired through CSI measurement performed in accordance with an optimum CSI feedback configuration in each CSI feedback configuration group in the set of CSI feedback configuration groups and position information about the optimum CSI feedback configuration in each CSI feedback configuration group in the set of CSI feedback configuration groups. Each set of CSI feedback configuration groups is indicated by the network side device to the UE, and includes one or more CSI feedback configuration groups.

In a possible embodiment of the present disclosure, the processor 600 is further configured to receive the indication information from the network side device, so as to indicate the CSI feedback configuration group configured for the carrier set.

In a possible embodiment of the present disclosure, the number of the optimum CSI feedback configurations in the CSI feedback configuration group is pre-defined, or indicated by the indication information in the DCI, or contained, as a configuration parameter, in configuration parameters of the CSI feedback configuration group, or contained, as a configuration parameter, in configuration parameters of one set of CSI feedback configuration groups to which the CSI feedback configuration group belongs. In the set of CSI feedback configuration groups, the number of the optimum CSI feedback configurations in all the CSI feedback configuration groups is identical.

In a possible embodiment of the present disclosure, each carrier corresponds to one CSI feedback configuration group, or all the carriers correspond to one CSI feedback configuration group.

In FIG. 7, bus architecture may include a number of buses and bridges connected to each other, so as to connect various circuits for one or more processors 600 and one or more memories 602. In addition, as is known in the art, the bus architecture may be used to connect any other circuits, such as a circuit for a peripheral device, a circuit for a voltage stabilizer and a power management circuit. Bus interfaces are provided, and the transceiver 601 may consist of a plurality of elements, i.e., a transmitter and a receiver for communication with any other devices over a transmission medium. The processor 600 may take charge of managing the bus architecture as well as general processings. The memory 602 may store therein data for the operation of the processor 600.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A Channel State Information (CSI) acquisition method, comprising steps of:
indicating, by a network side device, a plurality of CSI feedback configuration groups or a plurality of sets of CSI feedback configuration groups for aperiodic CSI feedback to a User Equipment (UE);
transmitting, by the network side device, Downlink Control Information (DCI) to the UE, wherein the DCI comprises indication information that indicates the UE to feedback the CSI acquired through the CSI measurement performed in accordance with an optimum CSI feedback configuration in each CSI feedback configuration group of the plurality of CSI feedback configuration groups and indicates the UE to feedback position information about the optimum CSI feedback configuration in the each CSI feedback configuration group; or the DCI comprises indication information that indicates one set of CS feedback configuration groups in the plurality of sets of CSI feedback configuration groups and indicates the UE to feed back the CSI acquired through CSI measurement performed in accordance with an optimum CSI feedback configuration in each CSI feedback configuration group in the one set of CSI feedback configuration groups and position information about the optimum CSI feedback configuration in the each CSI feedback configuration group in the set of CSI feedback configuration groups, wherein each set of CSI feedback configuration groups comprises one or more CSI feedback configuration groups; and receiving, by the network side device, CSI acquired by the UE through CS measurement, and position information about the optimum CSI feedback configuration in the each CSI feedback configuration group, or position information about the optimum CSI feedback configuration in the each CSI feedback configuration group in the set of CSI feedback configuration groups, wherein the position information and at least a part of the CSI are sequentially encoded, the position information about the optimum CSI feedback configuration in the each CSI feedback configuration group comprises: an index of the optimum CSI feedback configuration in the each CSI feedback configuration group; or a bitmap of a position of the optimum CSI feedback configuration in a position sequence of the each CSI feedback configuration group, and each CSI feedback configuration in the each CSI feedback configuration group corresponds to one position in the position sequence.

2. The CSI acquisition method according to claim 1, wherein the CSI measurement is performed by the UE in accordance with the optimum CSI feedback configuration in the CSI feedback configuration group, the optimum CSI feedback configuration is a CSI feedback configuration determined by the UE based on a largest Reference Signal Received Power (RSRP) measurement value, or a largest Channel Quality Indicator (CQI) estimation value, or a largest Transport Block size (TBsize) estimation value.

3. The CSI acquisition method according to claim 1, wherein,
the position information and the at least a part of the CSI sequentially encoded are mapped to a physical resource reserved for the at least apart of the CSI.

4. The CSI acquisition method according to claim 3, wherein the mapping of the position information and the at least a art of the CSI is performed according to a resource mapping mode of the at least a part of the CSI.

5. The CSI acquisition method according to claim 1, wherein the number of the optimum CSI feedback configurations in the each CSI feedback configuration group is pre-defined, or indicated by the indication information in the DCI, or contained, as a configuration parameter, in configuration parameters of the each CSI feedback configuration group, or contained, as a configuration parameter, in configuration parameters of one set of CSI feedback configuration groups to which the CSI feedback configuration group belongs; and
in the set of CSI feedback configuration groups, the number of the optimum CSI feedback configurations in all the CSI feedback configuration groups is identical.

6. The CSI acquisition method according to claim 1, wherein subsequent to the step of transmitting the DCI that indicates the UE to perform the aperiodic CSI feedback in accordance with the optimum CSI feedback configuration in the CSI feedback configuration group, the CSI acquisition method further comprises: performing a downlink precoding operation in accordance with the CSI corresponding to the optimum CSI feedback configuration and position information about the optimum CSI feedback configuration, or updating CSI feedback configuration information about a Physical Uplink Control Channel (PUCCH) in accordance with the position information about the optimum CSI feedback configuration.

7. The CSI acquisition method according to claim 1, wherein each carrier corresponds to one CSI feedback configuration group, or all carriers in a carrier set correspond to one CSI feedback configuration group.

8. The method according to claim 1, wherein, the position information about the optimum CSI feedback configuration in the CSI feedback configuration group is used to determine an optimum beamforming vector in a vertical direction, and the CSI corresponding to the optimum CSI feedback configuration in the CSI feedback configuration group is used to determine an optimum beamforming vector in a horizontal direction.

9. A Channel State Information (CSI) feedback method, comprising steps of:
receiving, by a User Equipment (UE), a plurality of CSI feedback configuration groups or a plurality of sets of CSI feedback configuration groups for aperiodic CSI feedback indicated by a network side device;

receiving, by the UE, Downlink Control Information (DCI) from the network side device, wherein, the DCI comprises indication information that indicates the UE to feedback the CSI acquired through the CSI measurement performed in accordance with an optimum CSI feedback configuration in each CSI feedback configuration group of the plurality of CSI feedback configuration groups, and indicates the UE to feedback position information about the optimum CSI feedback configuration in the each CSI feedback configuration group; or the DCI comprises indication information that indicates one set of CSI feedback configuration groups in the plurality of sets of CSI feedback configuration groups, and indicates the UE to feed back the CSI acquired through CSI measurement performed in accordance with an optimum CSI feedback configuration in each CSI feedback configuration group in the one set of CSI feedback configuration groups and position information about the optimum CSI feedback configuration in the each CSI feedback configuration group in the set of CSI feedback configuration groups, wherein each set of CSI feedback configuration groups comprises one or more CSI feedback configuration groups; and performing the aperiodic CSI feedback comprising CSI acquired by the UE through CSI measurement and comprising position information about the optimum CSI feedback configuration in each CSI feedback configuration group of the plurality of CSI feedback configuration groups, or comprising position information about the optimum CSI feedback configuration in each CSI feedback configuration group in the one set of the plurality of sets of CSI feedback configuration groups, wherein the position information and at least a part of the CSI are sequentially encoded, the position information about the optimum CSI feedback configuration in the CSI feedback configuration group comprises: an index of the optimum CSI feedback configuration in the CSI feedback configuration group; or a bitmap of a position of the optimum CSI feedback configuration in a position sequence of the CSI feedback configuration group.

10. The CSI feedback method according to claim 9, wherein the optimum CSI feedback configuration is a CSI feedback configuration determined by the UE based on a largest Reference Signal Received Power (RSRP) measurement value, or a largest Channel Quality Indicator (CQI) estimation value, or a largest Transport Block size (TBsize) estimation value.

11. The CSI feedback method according to claim 9, wherein the position information and the at least a part of the CSI sequentially encoded are mapped to a physical resource reserved for the at least a part of the CSI.

12. The CS feedback method according to claim 11, wherein,
the mapping of the position information and the at least a part of the CSI is performed according to a resource mapping mode of the at least a part of the CSI.

13. The CSI feedback method according to claim 12, further comprising receiving, by the UE, indication information from the network side device, to indicate the CSI feedback configuration group configured for a carrier set.

14. The CSI feedback method according to claim 12, wherein each carrier corresponds to one CSI feedback configuration group, or all carriers in a carrier set correspond to one CSI feedback configuration group.

15. The CSI feedback method according to claim 9, wherein the number of the optimum CSI feedback configurations in each CSI feedback configuration group is predefined, or indicated by the indication information in the DCI, or contained, as a configuration parameter, in configuration parameters of each CSI feedback configuration group, or contained, as a configuration parameter, in configuration parameters of one set of CSI feedback configuration groups to which the CSI feedback configuration group belongs; and
in the set of CSI feedback configuration groups, the number of the optimum CSI feedback configurations in all the CSI feedback configuration groups is identical.

16. A network side device, comprising:
a processor;
a memory connected to the processor through a bus interface and configured to store therein programs and data for an operation of the processor; and
a transceiver configured to communicate with other devices over a transmission medium, wherein
the processor is configured to call and execute the programs and data stored in the memory for:
indicating by the network side device, a plurality of CSI feedback configuration groups or a plurality of sets of CSI feedback configuration groups for aperiodic CSI feedback to a User Equipment (UE);
transmitting, by the network side device, Downlink Control Information (DCI) to the UE, wherein the DCI comprises indication information that indicates the UE to feedback the CSI acquired through the CSI measurement performed in accordance with an optimum CSI feedback configuration in each CSI feedback configuration group of the plurality of CSI feedback configuration groups, and indicates the UE to feedback position information about the optimum CSI feedback configuration in the each CSI feedback configuration group; or the DCI comprises indication information that indicates one set of CSI feedback configuration groups in the plurality of sets of CSI feedback configuration groups, and indicates the UE to feed back the CSI acquired through CSI measurement performed in accordance with an optimum CSI feedback configuration in each CSI feedback configuration group in the one set of CSI feedback configuration groups and position information about the optimum CSI feedback configuration in the each CSI feedback configuration group in the set of CSI feedback configuration groups, wherein each set of CSI feedback configuration groups comprises one or more CSI feedback configuration groups; and
receiving, by the network side device, CSI acquired by the UE through CSI measurement, and position information about the optimum CSI feedback configuration in the each CSI feedback configuration group, or position information about the optimum CSI feedback configuration in the each CSI feedback configuration group in the set of CSI feedback configuration groups,
wherein the position information and at least a part of the CSI are sequentially encoded,
the position information about the optimum CSI feedback configuration in the each CSI feedback configuration group comprises: an index of the optimum CSI feedback configuration in the each CSI feedback configuration group; or a bitmap of a position of the optimum CSI feedback configuration in a position sequence of the each CSI feedback configuration group, and
each CSI feedback configuration in the each CSI feedback configuration group corresponds to one position in the position sequence.

17. A User Equipment (UE), comprising:
a processor;
a memory connected to the processor through a bus interface and configured to store therein programs and data for an operation of the processor; and
a transceiver configured to communicate with other devices over a transmission medium, wherein
the processor is configured to call and execute the programs and data stored in the memory for:
receiving, by the UE, a plurality of CSI feedback configuration groups or a plurality of sets of CSI feedback configuration groups for aperiodic CSI feedback indicated by a network side device;
receiving, by the UE, Downlink Control Information (DCI) from the network side device, wherein, the DCI comprises indication information that indicates the UE to feedback the CSI acquired through the CSI measurement performed in accordance with an optimum CSI feedback configuration in each CSI feedback configuration group of the plurality of CSI feedback configuration groups, and indicates the UE to feedback position information about the optimum CSI feedback configuration in the each CSI feedback configuration group; or the DCI comprises indication information that indicates one set of CS feedback configuration groups in the plurality of sets of CSI feedback configuration groups, and indicates the UE to feed back the CSI acquired through CSI measurement performed in accordance with an optimum CSI feedback configuration in each CSI feedback configuration group in the one set of CSI feedback configuration groups and position information about the optimum CSI feedback configuration in the each CSI feedback configuration group in the set of CSI feedback configuration groups, wherein each set of CSI feedback configuration groups comprises one or more CSI feedback configuration groups; and
performing the aperiodic CSI feedback comprising CSI acquired by the UE through CSI measurement and comprising position information about the optimum CSI feedback configuration in each CSI feedback configuration group of the plurality of CSI feedback configuration groups, or comprising position information about the optimum CSI feedback configuration in each CSI feedback configuration group in the one set of the plurality of sets of CSI feedback configuration groups,
wherein the position information and at least a part of the CSI are sequentially encoded,
the position information about the optimum CSI feedback configuration in the CSI feedback configuration group comprises: an index of the optimum CSI feedback configuration in the CSI feedback configuration group;

or a bitmap of a position of the optimum CSI feedback configuration in a position sequence of the CSI feedback configuration group.

18. The UE according to claim 17, wherein the position information and the at least a part of the CSI sequentially encoded are mapped to a physical resource reserved for the at least a part of the CSI.

* * * * *